United States Patent
Reh et al.

(10) Patent No.: US 11,671,014 B2
(45) Date of Patent: Jun. 6, 2023

(54) BUCK-BOOST GROUND LEAKAGE CURRENT POWER SUPPLY

(71) Applicant: Fabriq, Ltd., Boulder, CO (US)

(72) Inventors: Jeffrey G. Reh, Longmont, CO (US); Matthew B. O'Kelley, Boulder, CO (US)

(73) Assignee: Fabriq, Ltd., Boulder, CO (US)

( * ) Notice: Subject to any disclaimer, the term of this patent is extended or adjusted under 35 U.S.C. 154(b) by 0 days.

(21) Appl. No.: 17/467,349

(22) Filed: Sep. 6, 2021

(65) Prior Publication Data

US 2021/0408910 A1    Dec. 30, 2021

Related U.S. Application Data

(63) Continuation-in-part of application No. 16/881,950, filed on May 22, 2020, now Pat. No. 11,116,065.

(60) Provisional application No. 62/851,733, filed on May 23, 2019, provisional application No. 62/851,741, filed on May 23, 2019.

(51) Int. Cl.
  *H02M 3/158* (2006.01)
  *H02M 1/12* (2006.01)
  *H02M 7/217* (2006.01)

(52) U.S. Cl.
  CPC ........ *H02M 3/1582* (2013.01); *H02M 1/123* (2021.05); *H02M 7/217* (2013.01)

(58) Field of Classification Search
  None
  See application file for complete search history.

(56) References Cited

U.S. PATENT DOCUMENTS

| | | |
|---|---|---|
| 5,909,365 A | 6/1999 | Merwin et al. |
| 6,472,853 B2 | 10/2002 | Nishihira et al. |
| 7,020,701 B1 | 3/2006 | Gelvin et al. |
| 7,307,542 B1 | 12/2007 | Chandler et al. |
| 7,382,271 B2 | 6/2008 | McFarland |
| 7,400,594 B2 | 7/2008 | Pereira et al. |
| 7,623,042 B2 | 11/2009 | Huizenga |
| 7,889,051 B1 | 2/2011 | Billig et al. |
| 7,925,384 B2 | 4/2011 | Huizenga et al. |
| 7,953,327 B2 | 5/2011 | Pereira et al. |
| 8,049,434 B2 | 11/2011 | Crouse et al. |

(Continued)

FOREIGN PATENT DOCUMENTS

GB    2491550 A    * 12/2012    ......... H05B 33/0812

*Primary Examiner* — Anh Q Tran
(74) *Attorney, Agent, or Firm* — Richard K. Huffman; Huffman Patent Group, LLC

(57) ABSTRACT

A power supply, includes: a hot node coupled to a hot wire of an AC source, and a ground node coupled to an earth ground, where a neutral wire of the source is not present; a storage component, coupled to a return node and in series with a current limiter, where the current limiter enables the storage component to charge to a voltage while limiting leakage current to a prescribed value; a low voltage power supply including a buck-boost regulator, coupled to the storage component and to a return node that provides a reference voltage, where the low voltage power supply receives the voltage and generates an output voltage on an output node that is referenced to the reference voltage; and a wireless transceiver that employs the output voltage to transmit and receive messages from one or more corresponding wireless devices.

20 Claims, 3 Drawing Sheets

GROUND LEAKAGE CURRENT POWER SUPPLY INSTALLATION

(56) References Cited

U.S. PATENT DOCUMENTS

| | | |
|---|---|---|
| 8,159,156 B2 | 4/2012 | Henig et al. |
| 8,264,168 B2 | 9/2012 | Feri et al. |
| 8,265,674 B2 | 9/2012 | Choong et al. |
| 8,290,437 B2 | 10/2012 | Simons et al. |
| 8,373,362 B2 | 2/2013 | Chemel et al. |
| 8,422,401 B1 | 4/2013 | Choo-Choong et al. |
| 8,928,188 B2 | 1/2015 | Shilling |
| 2006/0028582 A1 | 2/2006 | Zahn |
| 2007/0121648 A1 | 5/2007 | Hahn |
| 2008/0030075 A1 | 2/2008 | Stanley et al. |
| 2009/0026966 A1 | 1/2009 | Budde et al. |
| 2009/0045939 A1 | 2/2009 | Holland et al. |
| 2009/0066473 A1 | 3/2009 | Simons |
| 2009/0115385 A1* | 5/2009 | Williams ............ H05B 47/13 323/282 |
| 2011/0043116 A1 | 2/2011 | Schenk et al. |
| 2011/0090042 A1 | 4/2011 | Leonard et al. |
| 2011/0199004 A1 | 8/2011 | Henig et al. |
| 2012/0068822 A1 | 3/2012 | Sheikman et al. |
| 2012/0194083 A1 | 8/2012 | Henig et al. |
| 2012/0242231 A1 | 9/2012 | Yianni et al. |
| 2014/0001963 A1 | 1/2014 | Chobot et al. |
| 2015/0181682 A1 | 6/2015 | Shet et al. |
| 2015/0319006 A1 | 11/2015 | Plummer et al. |
| 2017/0142814 A1 | 5/2017 | Reh et al. |
| 2017/0142815 A1 | 5/2017 | Reh et al. |
| 2018/0288857 A1 | 10/2018 | Reh et al. |
| 2018/0288858 A1 | 10/2018 | Reh et al. |
| 2020/0375009 A1 | 11/2020 | Reh et al. |
| 2020/0375010 A1 | 11/2020 | Reh et al. |
| 2022/0117067 A1 | 4/2022 | Reh et al. |
| 2022/0117068 A1 | 4/2022 | Reh et al. |
| 2022/0117069 A1 | 4/2022 | Reh et al. |
| 2022/0117070 A1 | 4/2022 | Reh et al. |

\* cited by examiner

GROUND LEAKAGE CURRENT POWER SUPPLY INSTALLATION

GROUND LEAKAGE CURRENT POWER SUPPLY INSTALLATION

BUCK-BOOST GROUND LEAKAGE CURRENT POWER SUPPLY

CROSS-REFERENCE TO RELATED APPLICATIONS

This application is a continuation-in-part of the following U.S. patent application, which is herein incorporated by reference in its entirety.

| Ser. No. | FILING DATE | TITLE |
| --- | --- | --- |
| 16/881,950 | May 22, 2020 | GROUND LEAKAGE CURRENT POWER SUPPLY |

This application is related to the following co-pending U.S. patent applications, each of which has a common assignee and common inventors, the entireties of which are herein incorporated by reference.

| Ser. No. | FILING DATE | TITLE |
| --- | --- | --- |
| 17/464,149 | Sep. 1, 2021 | GROUND LEAKAGE CURRENT POWER SUPPLY FOR WIRELESS TRANSCEIVER |
| 17/464,218 | Sep. 1, 2021 | GROUND LEAKAGE CURRENT POWER SUPPLY FOR MICROPROCESSOR |
| 17/467,351 | Sep. 6, 2021 | BUCK-BOOST GROUND LEAKAGE CURRENT POWER SUPPLY FOR WIRELESS TRANSCEIVER |
| 16/881,993 | May 22, 2020 | MULTIMODE COMMISSIONING SWITCH POWERED BY GROUND LEAKAGE CURRENT |

BACKGROUND OF THE INVENTION

Field of the Invention

This invention relates in general to the field of building automation, and more particularly to a multimode commissioning switch that is powered exclusively by chassis ground leakage current.

Description of the Related Art

Up until more recent years, most building control systems (e.g., lighting, HVAC, etc.) were hard-wired. That is, signals for power, ground, control, and data were transmitted between controllers and sensors over physical wires. With the advent of low power wireless communications technologies (e.g., IEEE 802.15, Zigbee, Bluetooth, etc.), many buildings are being retrofitted with wireless fixtures and controls, examples of which include, but are not limited to, wireless LED lights, wireless switches, wireless occupancy sensors, wireless daylight harvesters, wireless thermostats and HVAC controls, and the like. Many of these products, specifically LED lighting and associated controls and sensors, allow building owners to significantly reduce energy consumption by virtue of enabling technology (e.g., LED lighting power requirements versus conventional fluorescent lighting power requirements) and remote/automated control over the internet. Accordingly, more and more owners are retrofitting their existing buildings with these wireless fixtures and controls.

As one skilled in the art will appreciate, retrofitting a small- to medium-size building is a significant endeavor involving both product and labor costs for, on average, most buildings have approximately three light fixtures plus one light switch per 100 square feet, which is the size of an average office. Consequently, the owner of a 50,000 square foot building would need to purchase and install approximately 1500 LED light fixtures along with 500 wireless switches. This is a significant investment and, thus, there is a desire in the art to reduce the cost of these wireless products and the labor required for their installation.

This disclosure addresses a well-known problem in the art, which has arisen as a result of developers incorporating "smart" controllers that are disposed in a conventional wall- or surface-mounted switch. These controllers may utilize wireless communications to sense movement of a physical switch and turn LED lights on and off in accordance with switch movement, or they may utilize power provided at the switch to control other devices over a wired connection. As one skilled in the art will also appreciate, more often than not, wiring for conventional switches consists of a hot wire from an AC power source, a switched leg wire that provides switched power to corresponding fixtures, and an earth (or "chassis") ground. That is, no neutral wire from the AC source is wired to the switch. In this case, the neutral lead from the AC power source is daisy-chained among the corresponding fixtures that are controlled by the switch. Thus, any controller that may be disposed within a retrofit switch requires a power source that is referenced to chassis ground and, as one skilled in the art will appreciate, chassis (or "earth") ground connections have "ground leakage" constraints imposed by type of circuit (e.g., ground fault interrupt) and regulatory agencies (e.g., Underwriters Laboratories). These constraints limit ground leakage current typically to less than 5 milliamperes—a value that does not support ground referenced power sources for any practicable smart controller that is disposed within the switch. This has been, and continues to be, as significant problem.

Numerous approaches have been fielded to overcome the above-noted problem, the most obvious of which is to use a battery within the switch for the power source. However, batteries fail—often at inopportune times—and must be replaced. Other approaches utilize transformers and triacs to harvest power from the AC hot lead for use by a controller, but these approaches generally exceed the amount of ground leakage that is allowed.

In U.S. Pat. No. 5,909,365, Merwin et al. disclose an electronic power supply that receives power from an AC hot lead and supplies power to a load that is reference to earth ground. The power supply stores energy in a "filter" capacitor that is coupled between the AC hot lead (through a rectifying diode) and earth ground. In addition, the impedance of the filter capacitor is chosen to ensure that the ground leakage current limit is not exceeded, and the present inventors have noted that utilizing the same component to store power and to limit ground current leakage is disadvantageous because the impedance of the component also limits the amount of energy that can be stored for use as a power supply.

In U.S. Pat. No. 8,928,188, Shilling discloses a power supply circuit for a remote load and a local (in-switch) controller that includes a line (i.e., hot) connection receiving electrical power from an AC source, a load connection that is hard-wired to the remote load, and a switch that is located between the line and load connections. A low voltage power supply supplies power from the AC source to a controller that is employed to selectively open and close the switch. The low voltage power supply has an energy storage portion. The energy storage portion is coupled between the AC hot connection and a node. A current limiter is coupled in series between the node and earth ground. An earth ground bypass portion is coupled between the node and the load connection. The other side of the remote load is coupled to a neutral lead from the AC source. The present inventors have also noted that while the disclosed power supply circuit includes a current limiter in series with the energy storage portion, and thus does not limit the amount of energy that may be stored, constant connection is required between the ground bypass portion and the remote load (and thus to AC neutral) to enable sufficient power to power the local controller, because the energy storage portion is unable to power the local controller on its own.

Accordingly, what is needed is a ground leakage power supply circuit that is sized such that a remote or local load that is coupled to the power supply circuit is sufficiently powered while simultaneously limiting ground leakage current below a prescribed value.

What is also needed is a power supply circuit disposed in a wall- or surface-mounted switch that does not require an AC neutral line for power, where the power supply circuit provides sufficient power for a prescribed period of time to a remote or local load, while simultaneously limiting ground leakage current below a prescribed threshold value.

What is furthermore needed is a multimode switch that includes a ground leakage power supply and a local switch controller therein powered by the ground leakage power supply, where the local switch controller enables switching of AC line voltage to a remote load.

What is moreover needed is a multimode switch that includes a ground leakage power supply and a wireless transceiver therein powered by the ground leakage power supply, where the wireless transceiver is employed to send and receive wireless messages to one or more corresponding wireless devices.

SUMMARY OF THE INVENTION

The present invention, among other applications, is directed to solving the above-noted problems and addresses other problems, disadvantages, and limitations of the prior art. The present invention provides a superior technique for powering a multimode switch using only an AC hot wire and an earth (or "chassis") ground wire, without requiring a neutral connection. In one embodiment, a ground leakage current power supply is provide that include: a hot node that is coupled to a hot wire of an AC power source, and an earth ground node that is coupled to an earth ground, where a neutral wire of the AC power source is not present; an energy storage component, coupled to a return node and to a rectifier, where the rectifier is also coupled to the return node and the earth ground node; a current limiter, coupled to the hot node and to the rectifier, configured to enable the energy storage component to charge to a voltage at a rate that limits ground leakage current to a prescribed value; and a low voltage power supply including a buck-boost regulator, coupled to the energy storage component and to the return node, the return node providing a return reference voltage, where the low voltage power supply receives the voltage and generates an output voltage on an output node that is referenced to the return reference voltage.

One aspect of the present invention contemplates a ground leakage current power supply, including: a hot node that is coupled to a hot wire of an AC power source, and an earth ground node that is coupled to an earth ground, where a neutral wire of the AC power source is not present; a rectifier, coupled to the hot node and to the earth ground node; an energy storage component, coupled to a return node and coupled in series to a current limiter that receives rectified power from the rectifier, where the current limiter enables the energy storage component to charge to a voltage at a rate that limits ground leakage current to a prescribed value; and a low voltage power supply including a buck-boost regulator, coupled to the energy storage component and to a return node, the return node providing a return reference voltage, where the low voltage power supply receives the voltage and generates an output voltage on an output node that is referenced to the return reference voltage.

Another aspect of the present invention comprehends a ground leakage current power supply, including: a hot node that is coupled to a hot wire of an AC power source, and an earth ground node that is coupled to an earth ground, where a neutral wire of the AC power source is not present; a rectifier, coupled to the hot node, the earth ground node, and a return node; an energy storage component, coupled to the return node and coupled in series to a current limiter that is coupled to receive rectified power from the rectifier, where the current limiter enables the energy storage component to charge to a voltage at a rate that limits ground leakage current to a prescribed value; and a low voltage power supply including a buck-boost regulator, coupled to the energy storage component and to the return node, the return node providing a return reference voltage, and configured to receive the voltage value, and configured generate a regulated output voltage that is referenced to the return reference voltage, where the low voltage power supply receives the voltage and generates an output voltage on an output node that is referenced to the return reference voltage.

BRIEF DESCRIPTION OF THE DRAWINGS

These and other objects, features, and advantages of the present invention will become better understood with regard to the following description, and accompanying drawings where.

DETAILED DESCRIPTION

Figure 1:
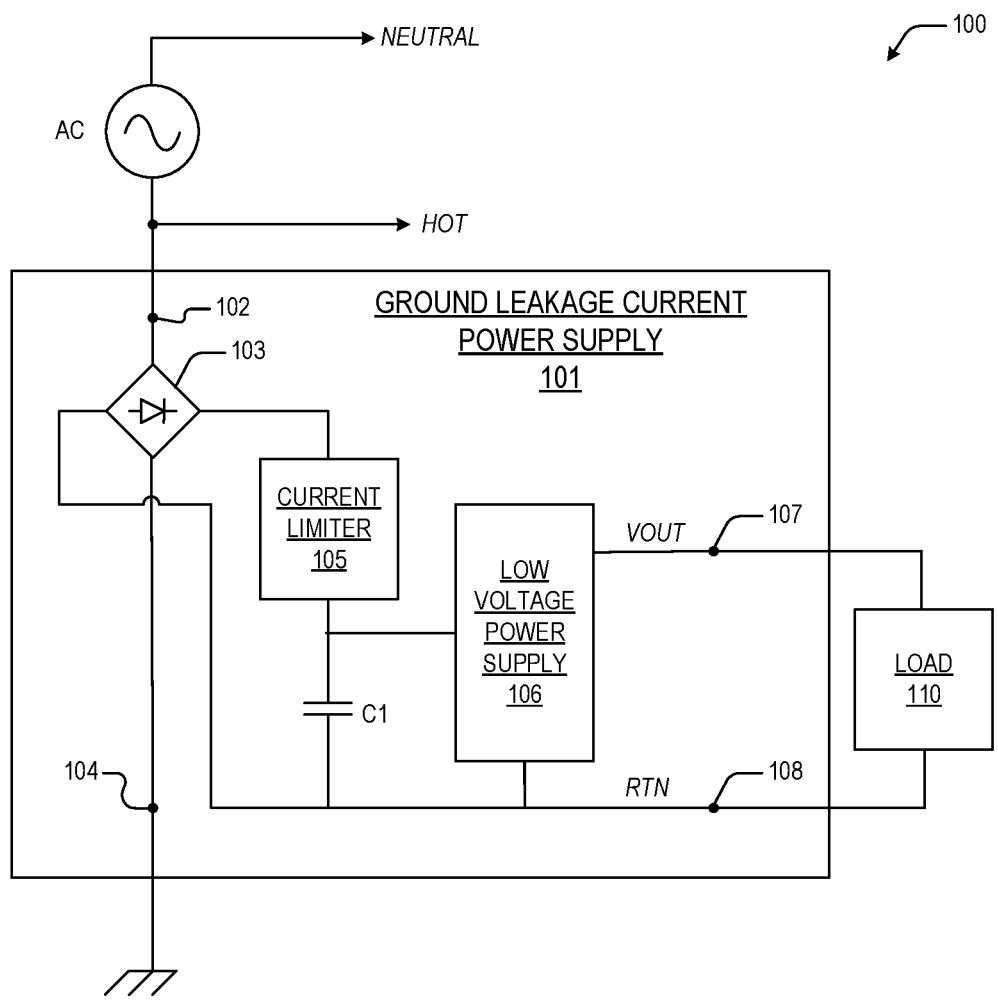
FIG. 1 is a block diagram illustrating one embodiment of a ground leakage current power supply installation according to the present invention.

Exemplary and illustrative embodiments of the invention are described below. It should be understood at the outset that although exemplary embodiments are illustrated in the figures and described below, the principles of the present disclosure may be implemented using any number of techniques, whether currently known or not. In the interest of clarity, not all features of an actual implementation are described in this specification, for those skilled in the art will appreciate that in the development of any such actual embodiment, numerous implementation specific decisions are made to achieve specific goals, such as compliance with system-related and business-related constraints, which vary from one implementation to another. Furthermore, it will be appreciated that such a development effort might be complex and time-consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present invention will now be described with reference to the attached figures. Various structures, systems, and devices are schematically depicted in the drawings for purposes of explanation only and so as to not obscure the present invention with details that are well known to those skilled in the art. Nevertheless, the attached drawings are included to describe and explain illustrative examples of the present invention. Unless otherwise specifically noted, articles depicted in the drawings are not necessarily drawn to scale.

The words and phrases used herein should be understood and interpreted to have a meaning consistent with the understanding of those words and phrases by those skilled in the relevant art. No special definition of a term or phrase (i.e., a definition that is different from the ordinary and customary meaning as understood by those skilled in the art) is intended to be implied by consistent usage of the term or phrase herein. To the extent that a term or phrase is intended to have a special meaning (i.e., a meaning other than that understood by skilled artisans) such a special definition will be expressly set forth in the specification in a definitional manner that directly and unequivocally provides the special definition for the term or phrase. As used in this disclosure, "each" refers to each member of a set, each member of a subset, each member of a group, each member of a portion, each member of a part, etc.

Applicants note that unless the words "means for" or "step for" are explicitly used in a particular claim, it is not intended that any of the appended claims or claim elements are recited in such a manner as to invoke 35 U.S.C. § 112(f).

Referring to FIG. 1, a block diagram illustrating one embodiment of a ground leakage current power supply installation 100 according to the present invention. The installation 100 includes an AC power source that includes a hot line and a neutral line. The hot line is coupled to a hot node 102 within a ground leakage current power supply 101 according to the present invention. The ground leakage current power supply 101 also has a chassis ground node 104 that is coupled to earth ground, an output voltage node 107 supplying an output voltage VOUT to a load 110, and a return node 108 that provides a ground return RTN to the load 110. In one embodiment, the nodes 102, 104, 107-108 may comprise wiring terminals within a wall- or surface-mounted switch.

In one embodiment the power supply 101 may also include a rectifier circuit 103 that is coupled between the hot node 102 and the chassis ground node 104 and between the return node 108 and a current limiter circuit 105. In another embodiment (not shown) the power supply 101 may also include a current limiter circuit 105 that is coupled to the hot node 101 and to a rectifier circuit 103, where the rectifier circuit 103 is also coupled to the return node 103 and the chassis ground node 104. In any of these embodiments, the current limiter circuit 105 may comprise active components, passive components, or a combination of active and passive components. An energy storage component C1 is coupled between the current limiter circuit 105 and the return node. In one embodiment, the energy storage component C1 comprises a capacitor C1 that is sized to charge from rectified AC power to a level sufficient to allow for power to be supplied to the load 110 for a prescribed period of time. In one embodiment, the capacitance of the energy storage component C1 ranges from approximately 0.1 to 0.5 farads; however, the current limiter 105 is configured to allow for any size energy storage capacitor C1. Consequently, depending upon application, the energy storage component C1 can be sized to support large power surges for finite periods of time. Exemplary applications that require relatively large surges of power include, but are not limited to, radios during transmission, microprocessors that wake up from low power mode to active mode, flashing of LED's, etc. The power requirements for these applications often exceed the allowable power that can be drawn from the desired input power source, the AC hot line and earth ground.

Operationally, during every half cycle of the AC hot line HOT the energy storage component C1 is charged, typically not reaching its full voltage potential due to the limited amount of current that is charging it; however, over several cycles charge will reach its full potential and, therefore, maximize stored energy. It is noted that the amount of time/cycles required to reach full potential is a function of the size of the energy storage component. The current limiter 105 limits the amount of charging current provided to the energy storage component C1 according to a prescribed limit. In one embodiment, the prescribed limit is 3 milliamperes. Another embodiment comprises a limit of 5 milliamperes. Other embodiments are contemplated according to application of the ground leakage power supply A low voltage power supply 106 is coupled to the energy storage component C1. The low voltage power supply 106 receives voltage from the energy storage component C1 and generates a regulated output voltage VOUT to the output voltage node 107, which can supply power to the load 110 for a prescribed period of time. In one embodiment, the current limiter 105 is sized to provide a 3 milliampere ground leakage current limit, and the energy storage component C1 is sized to 0.47 farads and the low voltage power supply 106 is configured to provide an output voltage between 3.0 and 3.3 volts to the load 110 at 25 milliamperes for 1 millisecond, which is typical of that required for transmission of wireless messages. Such a configuration would also allow for 47 seconds of providing VOUT at 6 milliamperes, which is typical of the current required to operate a wireless radio in receive mode. It is noted that the duty cycle for charging and power draw by the load is approximately 50 percent. This embodiment, and other embodiments disclosed herein are provided to more clearly teach aspects of the present invention as it may be tailored to a particular application; however, the present inventors note that because control of leakage current does not depend upon the size of C1, C1 (and other components may be configured to provide a wide variety of power supply voltages and burst currents.

In one embodiment, the low voltage power supply 106 comprises a linear voltage regulator. In another embodiment, the low voltage power supply 106 comprises a buck voltage regulator. In yet another embodiment, the low voltage power supply 106 comprises a buck-boost voltage regulator.

Figure 2:
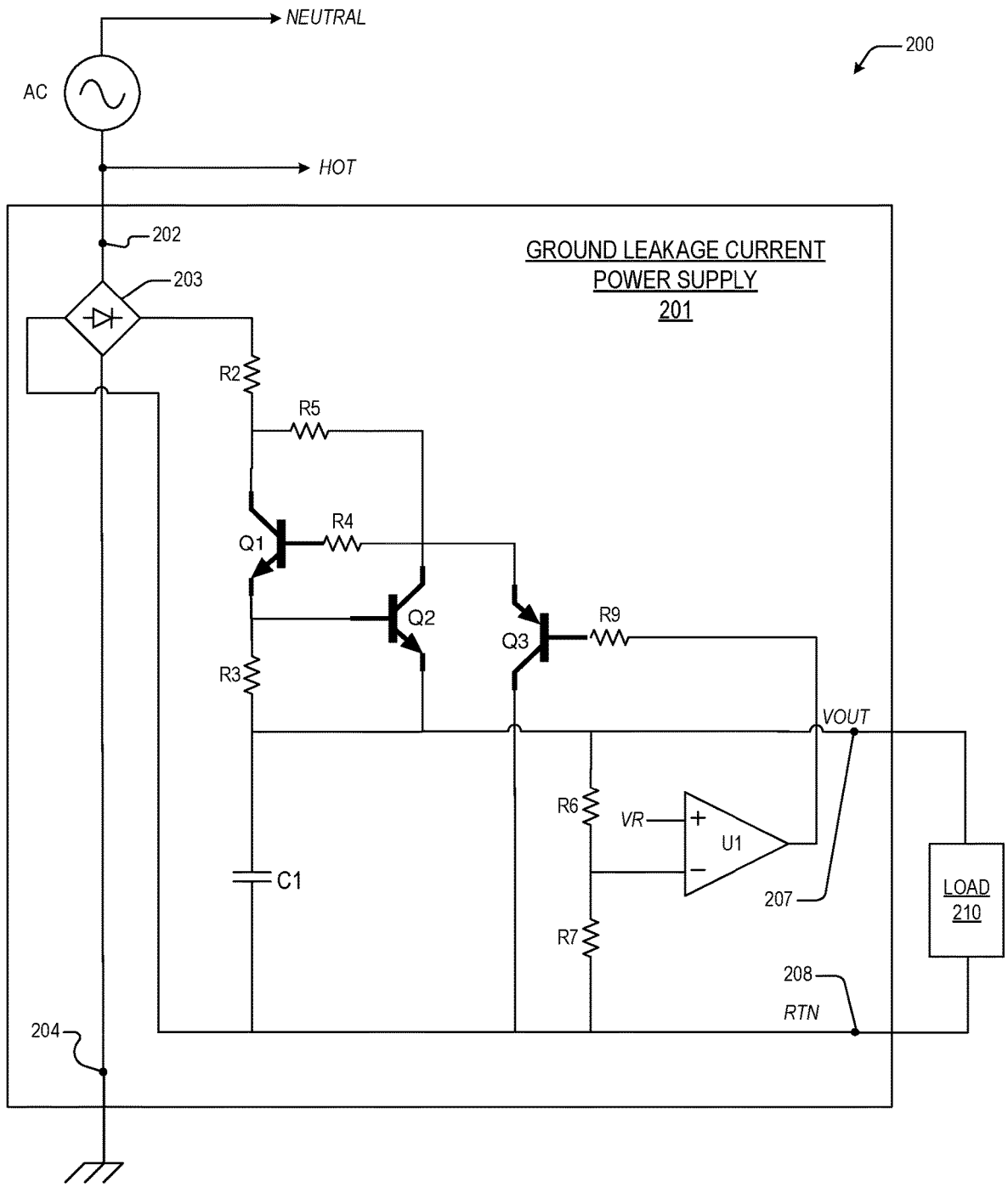
FIG. 2 is a block diagram depicting another embodiment of a ground leakage current power supply installation according to the present invention.

Turning now to FIG. 2, a block diagram is presented depicting another embodiment of a ground leakage current power supply installation 200 according to the present invention. Like the installation 100 of FIG. 1, the installation 200 of FIG. 2 includes an AC power source that has a hot line and a neutral line. The hot line is coupled to a hot node 202 within a ground leakage current power supply 201 according to the present invention. The ground leakage current power supply 201 also has a chassis ground node 204 that is coupled to earth ground, an output voltage node 207 supplying an output voltage VOUT to a load 210, and a return node 208 that provides a ground return RTN to the load 210. In one embodiment, the nodes 202, 204, 207-2108 may comprise conventional wiring terminals within a wall- or surface-mounted switch.

The power supply 201 may also include a rectifier circuit 203 that is coupled between the hot node 202 and the chassis ground node 204 and between the return node 208 and resistor R2. Resistor R2 is coupled to resistor R5 and to the collector of NPN transistor Q1. The emitter of Q1 is coupled to resistor R3 and to the base of NPN transistor Q2. Resistor R3 is coupled to the output voltage node 207 and to energy storage component C1, and C1 is coupled to the return node 208. Resistor R5 is coupled to resistor R4, the collector Q2 and the emitter of PNP transistor Q3. Resistor R4 is coupled to the base of Q1 and the emitter of Q3. The emitter of Q2 is coupled to the output voltage node 207. The collector of Q3 is coupled to the return node 208.

Resistor R6 is coupled to the output voltage node 207, resistor R7 and the negative input of operational amplifier U1. R7 is coupled to the return node. The positive input of U1 is coupled to a reference voltage VR. The output of U1 is coupled to resistor R9 and R9 is coupled to the base of Q3.

Components R2-R5, Q1, and Q2 are configured to provide a prescribed ground leakage current limit, which is routed from the return node 208 through the rectifier 203 to the earth ground node 204. Components R6-R7, R9, and U1, along with the value of VR are configured to provide a regulated low voltage to the load 210 via the output voltage node 207.

In one embodiment, the energy storage component C1 comprises a capacitor C1 that is sized to charge from rectified AC power to a level sufficient to allow for power to be supplied to the load 210 for a prescribed period of time. In one embodiment, the capacitance of the energy storage component C1 ranges from approximately 0.1 to 0.5 farads; however, components R2-R5, Q1 and Q2 may be configured to allow for any size energy storage capacitor C1. Consequently, depending upon application, the energy storage component C1 can be sized to support large power surges for finite periods of time, as is discussed above with reference to FIG. 1.

Operationally, during every half cycle of the AC hot line HOT the energy storage component C1 is charged, typically not reaching its full voltage potential due to the limited amount of current that is charging it; however, over several cycles charge will reach its full potential and, therefore, maximize stored energy. It is noted that the amount of time/cycles required to reach full potential is a function of the size of the energy storage component. Components R2-R5, Q1, and Q2 limit the amount of charging current to the energy storage component C1 according a prescribed limit. In one embodiment, the prescribed limit is 3 milliamperes. Another embodiment comprises a limit of 5 milliamperes.

Voltage regulation is achieved using a hysteretic converter comprising R6, R7, R9, Q3, and U1. A voltage divider comprising R6 and R7 along with VREF, sets the desired output voltage, VOUT. U1 may comprise a voltage comparator U1 having a negative ("−") input that comprises a percentage value of VOUT, as determined by the values of R6 and R7. VREF comprises a reference voltage that is coupled to the positive ("+") input to U1. Accordingly, when the voltage on the negative input increases above VREF the output of the comparator U1 will be pulled to RTN, turning on Q3 through R9. As a result, Q3 will divert the base current of Q1 thus turning Q1 off, which will halt charging of C1.

When the voltage on the negative input of U1 decreases below VREF, the output of the comparator, U1, will float. This will turn off Q3, and the resulting current to the base of Q1 will cause Q1 to turn on and commence charging cap C1.

Figure 3:
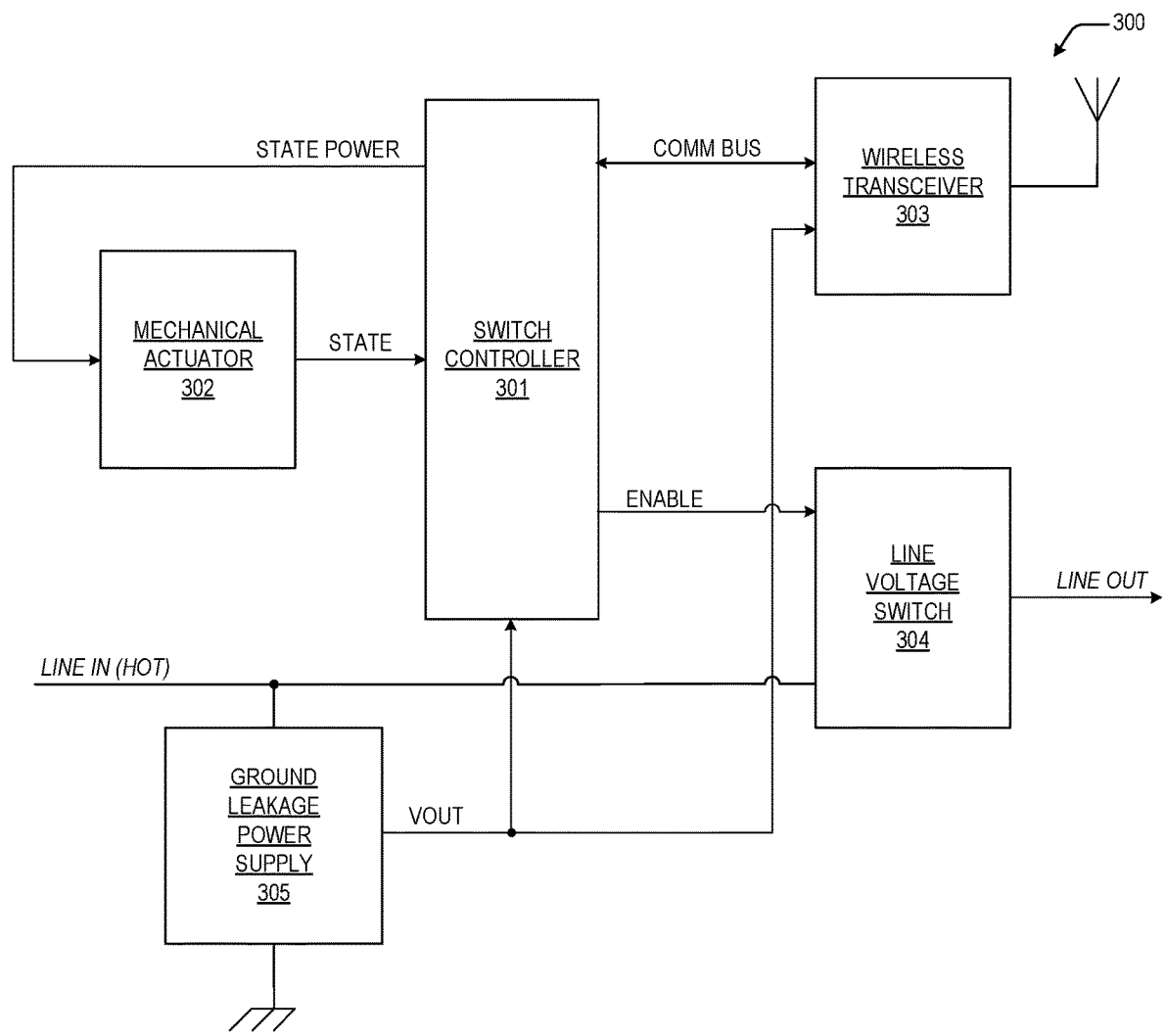
FIG. 3 is a block diagram featuring a one embodiment of multimode switch according to the present invention.

Now referring to FIG. 3, a block diagram is presented of a multimode wireless switch 300 according to the present invention. The switch 300 may be disposed as a wall- or surface-mounted switch. The switch 300 includes a switch controller 301 that is coupled to a mechanical actuator 302 via a STATE POWER bus and a STATE bus. The switch controller 301 is also coupled to a wireless transceiver 303 via a COMM bus. The switch controller 301 is further coupled to a line voltage switch 304 via an ENABLE bus. The line voltage switch 304 receives a line voltage (e.g. AC hot) over bus LINE IN and provides switching of the line voltage to a load side for powering of associated devices (not shown) via bus LINE OUT. The line voltage switch 304 may comprise electrical elements (e.g., semiconductor switches, etc.), mechanical elements (e.g., levers, actuators, etc.), or electromechanical elements (e.g., relays, solenoids, etc.). In one embodiment, the associated devices may comprise LED light fixtures that correspond to the multimode switch 300.

The wireless switch 300 may also comprise a ground leakage current power supply 305 such as is described above with reference to FIGS. 1 and 2. LINE IN (i.e., AC hot wire) and chassis ground are coupled to the power supply 305. No AC neutral is present. In one embodiment, the power supply 305 is configured to provide a supply voltage VOUT that may be employed to supply power to the switch controller 301 and wireless transceiver 303. In one embodiment, the value of VOUT is 5 volts. Another embodiment contemplates a 3.3-volt value of VOUT.

In operation, the switch controller 301 is configured to transmit and receive wireless messages over a wireless network (not shown) according to a wireless protocol (e.g., Wi-Fi, IEEE 802.11, IEEE 802.15.4, ZIGBEE®, Z-WAVE®, BLUETOOTH®, etc.) chosen for intended application. The messages may be transmitted/received between the switch 300 and a gateway (not shown), between the switch 300 and a commissioning device, or between the switch 300 and associated wireless devices. In one embodiment, control of the associated wireless devices is provided for by wireless messages generated by the gateway. In another embodiment, control of the associated wireless devices is provided for by wireless messages generated by the switch 300 operating under wireless operating rules provided by the gateway. In yet another embodiment, control of the associated wireless devices is provided for by wireless messages generated by both the switch 300 and the gateway. Accordingly, in a wireless operating mode, the switch controller 301 may assert STATE POWER and then sense the state (e.g., open or closed, level of dimming selected, light color, etc.) of the actuator 302 over bus STATE. According to chosen application, the switch controller 301 may either transmit messages to the gateway indicating state of the actuator 302 or may transmit control messages to the associated wireless devices to control their operation. In all modes of operation, when state of the mechanical actuator 402 is changed (e.g., toggled, pressed, different knob position, etc.), the switch controller 401 is configured to transmit messages over the network, via the wireless transceiver 303, indicating state change.

The mechanical actuator 302 may comprise any well-known elements of a present-day light switch, dimmer, or selector knob, with additional elements (if required) to couple to STATE POWER and STATE.

In a legacy line voltage switch mode, the switch controller 301 may be configured to direct the line voltage switch 304 to provide line voltage to the associated wireless devices over LINE OUT. When ENABLE is not asserted, the line voltage switch 304 does not provide line voltage to the associated wireless devices. When ENABLE is asserted, the line voltage switch 304 provides line voltage to the associated wireless devices. In this mode, the switch controller 301 may sense the state of the mechanical actuator 302 via STATE and may assert ENABLE when STATE indicates that the actuator 302 is in an "ON" state and may not assert ENABLE when STATE indicates that the actuator 302 is in an "OFF" state. The multimode wireless switch 300 may also be configured to enter the legacy line voltage switch mode as a default mode prior to being commissioned onto the wireless network, thus advantageously allowing for control of its associated wireless devices via sensing state of the actuator 302.

When placed in either an autonomous mode or a commission and describe mode, the switch controller 301 will assert ENABLE, thus powering on its associated devices to allow for discovery and commissioning. While in these two modes, the multimode wireless switch 300 will not function as a legacy line voltage switch and will only switch line voltage to the associated devices when directed to do so by commissioning devices. In autonomous mode, the switch 300 is directed to switch line voltage via wireless message. In commission and describe mode, the switch 300 is directed via wireless message to enable legacy line voltage switching responsive to actuation of the mechanical actuator 302.

The switch controller 301 may be further configured to broadcast identifying information (e.g., unique network ID, device function, switch type, etc.) for capture by the commissioning device (or gateway), or may be configured to begin broadcasting the identifying information responsive to broadcasted commissioning messages received from the commissioning device (or gateway).

Upon receipt of a message directing that the switch 300 perform autonomous harvesting of its associated wireless devices, the controller 301 may be configured to de-assert ENABLE for a prescribed time period, and then assert ENABLE, thus removing line voltage from the associated wireless devices for the prescribed time period, whereby the associated wireless devices transmit wireless messages to the commissioning device (or gateway) indicating they have been power cycled, thus providing for creation of a functional device group comprising the switch 300 and associated wireless devices. Following this, the switch 300 may be also configured to receive identifying information and functional group designation for all of the associated wireless devices. Thereafter, the controller 301 may de-assert ENABLE and may subsequently control one or more of the associated wireless devices via wireless messages using the identifying information corresponding to the one or more of the associated wireless devices.

Upon receipt of a message directing that the switch 300 perform commission and describe harvesting of its associated wireless devices, the controller 301 may be configured to de-assert ENABLE and then monitor STATE to detect when a technician toggles the mechanical actuator 302. The controller 301 may then assert/de-assert ENABLE according to the state of the actuator 302 until the switch 300 receives wireless messages from the commissioning device (or gateway) providing identifying information and functional group designation for all the associated wireless devices. Thereafter, the controller 301 may de-assert ENABLE and may subsequently control one or more of the associated wireless devices via wireless messages using the identifying information corresponding to the one or more of the associated wireless devices.

The multimode wireless switch 300 according to the present invention is configured to perform the functions and operations as discussed above. The multimode wireless switch 300 may comprise logic, circuits, devices, or microcode (i.e., micro instructions or native instructions), or a combination of logic, circuits, devices, or microcode, or equivalent elements that are employed to execute the functions and operations according to the present invention as noted. The elements employed to accomplish these operations and functions within the multimode wireless switch 300 may be shared with other circuits, microcode, etc., that are employed to perform other functions and/or operations within multimode wireless switch 300. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC) microprocessor. For a complex instruction set computer (CISC) microprocessor, complex instructions are translated by elements within the CISC microprocessor into associated micro instructions, and the associated micro instructions are directly executed by a unit or units within the CISC microprocessor.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer program product, a computer system, a microprocessor, a central processing unit, or similar electronic computing device, that manipulates and transforms data represented as physical, electronic quantities within the computer system's registers and memories into other data similarly represented as physical quantities within the computer system memories or registers or other such information storage, transmission or display devices. The devices may comprise one or more CPUs that are coupled to a computer-readable storage medium. Computer program instructions for these devices may be embodied in the computer-readable storage medium. When the instructions are executed by the one or more CPUs, they cause the devices to perform the above-noted functions, in addition to other functions.

Note also that the software implemented aspects of the invention are typically encoded on some form of program storage medium or implemented over some type of transmission medium. The program storage medium may be electronic (e.g., read only memory, flash read only memory, electrically programmable read only memory), random access memory magnetic (e.g., a floppy disk or a hard drive) or optical (e.g., a compact disk read only memory, or "CD ROM"), and may be read only or random access. Similarly, the transmission medium may be metal traces, twisted wire pairs, coaxial cable, optical fiber, or some other suitable transmission medium known to the art. The invention is not limited by these aspects of any given implementation.

The particular disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims. For example, components/elements of the systems and/or apparatuses may be integrated or separated. In addition, the operation of the systems and apparatuses disclosed herein may be performed by more, fewer, or other components and the methods described may include more, fewer, or other steps. Additionally, unless otherwise specified steps may be performed in any suitable order.

Although specific advantages have been enumerated above, various embodiments may include some, none, or all of the enumerated advantages.

What is claimed is:

1. A ground leakage current power supply, comprising:
a hot node that is coupled to a hot wire of an AC power source, and an earth ground node that is coupled to an earth ground, wherein a neutral wire of said AC power source is not present;
an energy storage component, coupled to a return node and to a rectifier,
wherein said rectifier is also coupled to said return node and said earth ground node;
a current limiter, coupled to said hot node and to said rectifier, configured to enable said energy storage component to charge to a voltage at a rate that limits ground leakage current to a prescribed value; and
a low voltage power supply comprising a buck-boost regulator, coupled to said energy storage component and to said return node, said return node providing a return reference voltage, wherein said low voltage power supply receives said voltage and generates an output voltage for a prescribed period of time on an output node that is referenced to said return reference voltage.

2. The ground leakage current power supply as recited in claim 1, wherein said energy storage component comprises a capacitor.

3. The ground leakage current power supply as recited in claim 1, wherein said current limiter comprises an active current limiter circuit.

4. The ground leakage current power supply as recited in claim 1, wherein said current limiter comprises a passive current limiter circuit.

5. The ground leakage current power supply as recited in claim 1, wherein said output voltage comprises a value of approximately 3.3 volts DC.

6. The ground leakage current power supply as recited in claim 1, wherein said low voltage power supply is configured to supply a 25 milliampere current to a load for at least 1 millisecond.

7. The ground leakage current power supply as recited in claim 1, wherein said low voltage power supply is configured to supply a 6 milliampere current to a load for at least 47 seconds.

8. A ground leakage current power supply, comprising:
a hot node that is coupled to a hot wire of an AC power source, and an earth ground node that is coupled to an earth ground, wherein a neutral wire of said AC power source is not present;
a rectifier, coupled to said hot node and to said earth ground node;
an energy storage component, coupled to a return node and coupled in series to a current limiter that receives rectified power from said rectifier, wherein said current limiter enables said energy storage component to charge to a voltage at a rate that limits ground leakage current to a prescribed value; and
a low voltage power supply comprising a buck-boost regulator, coupled to said energy storage component and to a return node, said return node providing a return reference voltage, wherein said low voltage power supply receives said voltage and generates an output voltage for a prescribed period of time on an output node that is referenced to said return reference voltage.

9. The ground leakage current power supply as recited in claim 8, wherein said energy storage component comprises a capacitor.

10. The ground leakage current power supply as recited in claim 8, wherein said current limiter comprises an active current limiter circuit.

11. The ground leakage current power supply as recited in claim 8, wherein said current limiter comprises a passive current limiter circuit.

12. The ground leakage current power supply as recited in claim 8, wherein said output voltage comprises a value of approximately 3.3 volts DC.

13. The ground leakage current power supply as recited in claim 8, wherein said low voltage power supply is configured to supply a 25 milliampere current to a load for at least 1 millisecond.

14. The ground leakage current power supply as recited in claim 8, wherein said low voltage power supply is configured to supply a 6 milliampere current to a load for at least 47 seconds.

15. A ground leakage current power supply, comprising:
a hot node that is coupled to a hot wire of an AC power source, and an earth ground node that is coupled to an earth ground, wherein a neutral wire of said AC power source is not present;
a rectifier, coupled to said hot node, said earth ground node, and a return node;
an energy storage component, coupled to said return node and coupled in series to a current limiter that is coupled to receive rectified power from said rectifier, wherein said current limiter enables said energy storage component to charge to a voltage at a rate that limits ground leakage current to a prescribed value; and
a low voltage power supply comprising a buck-boost regulator, coupled to said energy storage component and to said return node, said return node providing a return reference voltage, and configured to receive said voltage value, and configured generate a regulated output voltage that is referenced to said return reference voltage, wherein said low voltage power supply receives said voltage and generates an output voltage for a prescribed period if time on an output node that is referenced to said return reference voltage.

16. The ground leakage current power supply as recited in claim 15, wherein said energy storage component comprises a capacitor.

17. The ground leakage current power supply as recited in claim 15, wherein said current limiter comprises an active current limiter circuit.

18. The ground leakage current power supply as recited in claim 15, wherein said current limiter comprises a passive current limiter circuit.

19. The ground leakage current power supply as recited in claim 15, wherein said low voltage power supply is configured to supply a 25 milliampere current to a load for at least 1 millisecond.

20. The ground leakage current power supply as recited in claim 15, wherein said low voltage power supply is configured to supply a 6 milliampere current to a load for at least 47 seconds.

* * * * *